United States Patent [19]

Brodoff

[11] 4,341,643
[45] Jul. 27, 1982

[54] SETTLING TANKS FOR WASTE DISPOSAL

[76] Inventor: Bernard Brodoff, 4200-22 Hutchinson River Pkwy. East, Bronx, N.Y. 10475

[21] Appl. No.: 283,150

[22] Filed: Jul. 14, 1981

Related U.S. Application Data

[63] Continuation of Ser. No. 164,789, Jun. 30, 1980, abandoned.

[51] Int. Cl.³ ........................................... B01D 21/02
[52] U.S. Cl. ................................... 210/803; 210/136; 210/532.1
[58] Field of Search .................... 4/317, 318, 321, 323, 4/420, 428; 134/34; 137/803; 210/801, 803, 136, 513, 519, 532.1

[56] References Cited

U.S. PATENT DOCUMENTS 1,717,764  6/1929  D'Olier .............................. 210/803
3,418,664 12/1968  Carmichael et al. .................. 4/317
3,485,365 12/1969  Keller ................................ 210/519
3,972,814  8/1976  Paszyc et al. ...................... 210/801

Primary Examiner—Ivars C. Cintins
Attorney, Agent, or Firm—Brumbaugh, Graves, Donohue & Raymond

[57] ABSTRACT

A settling tank having a lower contoured surface on which particulate matter, solids and sludge settle and means for flowing a fluid stream utilizing the Coanda effect for sweeping the settled matter across the contoured surface to a discharge.

8 Claims, 11 Drawing Figures

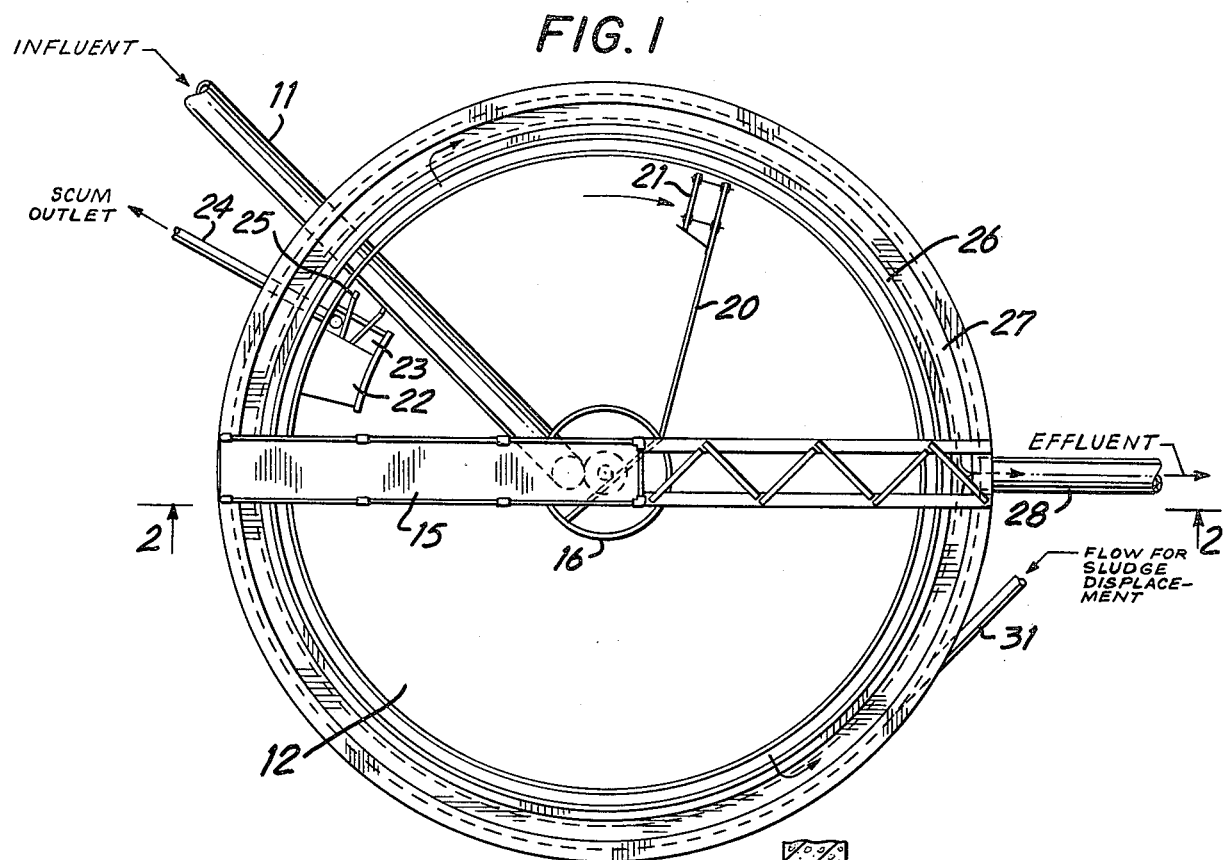
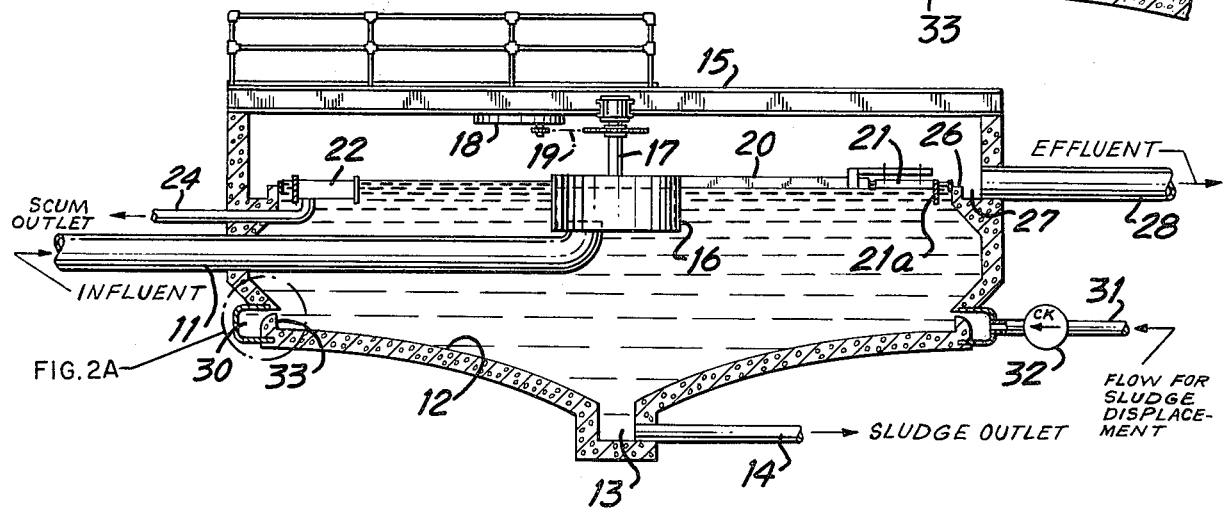

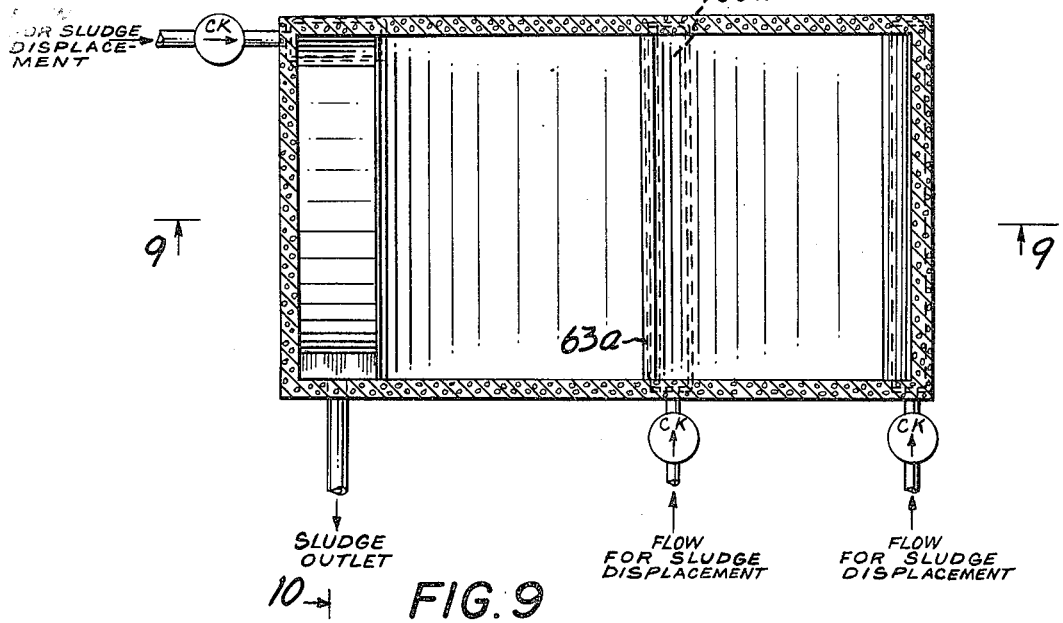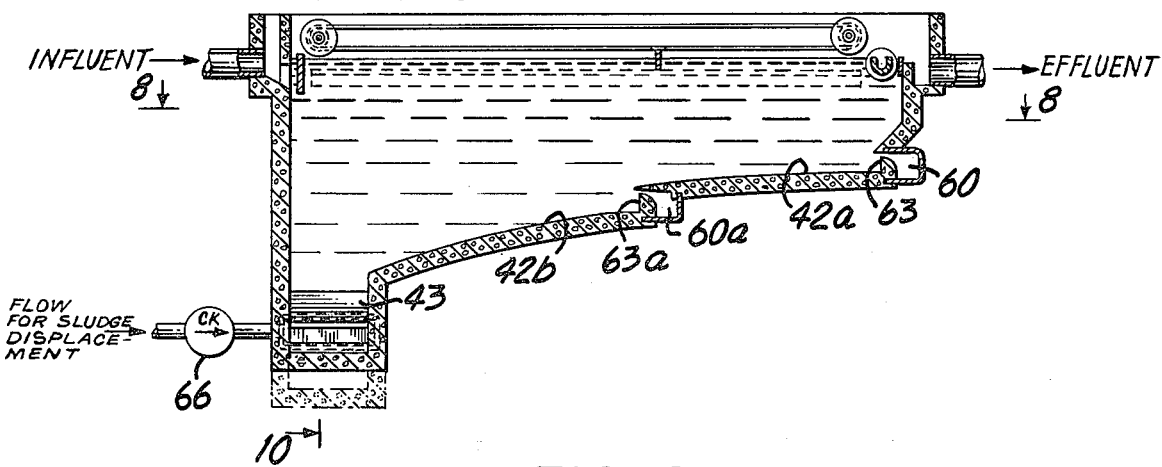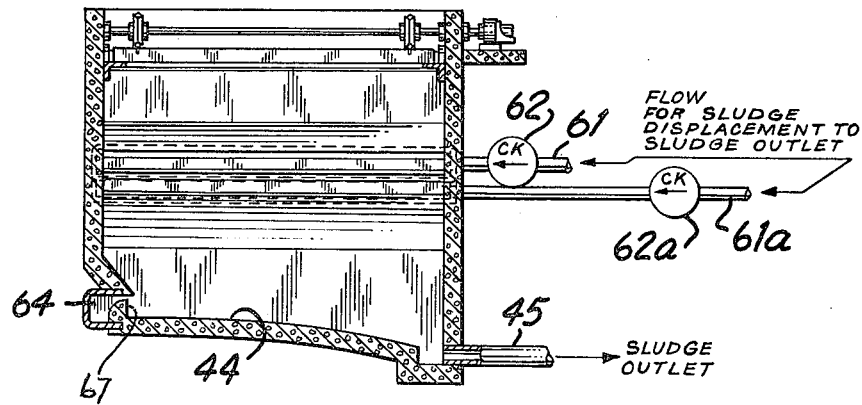

SETTLING TANKS FOR WASTE DISPOSAL

This is a continuation of application Ser. No. 164,789, filed June 30, 1980, now abandoned.

This invention relates to settling tanks for sewage or industrial wastes, and more particularly to a novel design for a settling tank in which the solids and sludge settled therein are swept along a contoured lower surface within the tank to a discharge utilizing the principles of the Coanda effect.

In many conventional settling tanks the solids and sludge are scraped from the settling surface within the settling tank toward a discharge by a plurality of scraper blades. In circular settling tanks these scraper blades are carried by a huge rotating truss submerged within the tank, and the scraping blades are oriented to displace the solids toward a discharge at the center of the tank. In rectangular settling tanks the scraper blades are carried by a conveyor submerged within the tank which moves the scraper blades longitudinally across the bottom of the tank from one end to the other. These submerged systems are costly and require extensive repair and maintenance during which the settling tank is not in operation.

The settling tank of the present invention provides a novel means for displacing the solids and sludge along the bottom of the settling tank toward a discharge from the bank. This is accomplished by providing the bottom of the settling tank with a balanced, contoured geometrical surface between a fluid inlet and a discharge and utilizing the Coanda effect to flow the fluid across the surface and displace the solids and sludge to the discharge.

In a preferred embodiment of the invention, the fluid inlet is the discharge from a plenum chamber in communication with a source of fluid under pressure. The Coanda effect causes the fluid to flow across and cling to the lower contoured surface within the tank while displacing the solids and sludge along the contoured surface. The debris displacing fluid may be flowed continuously or intermittently across the contoured surface in the tank. Moreover, the sweeping operation may be carried out in multiple stages from an upstream contoured surface to a downstream contoured surface with flow across successive stages being activated either simultaneously or sequentially.

For a complete understanding of the invention, reference should be made to the detailed description which follows and to the accompanying drawings, in which:

FIG. 1 is a plan view of a circular settling tank embodying the present invention;

FIG. 2 is a cross-sectional view taken along the line 2—2 of FIG. 1 looking in the direction of the arrows;

FIG. 2A is an enlarged view of a portion of FIG. 2;

Figure 5:
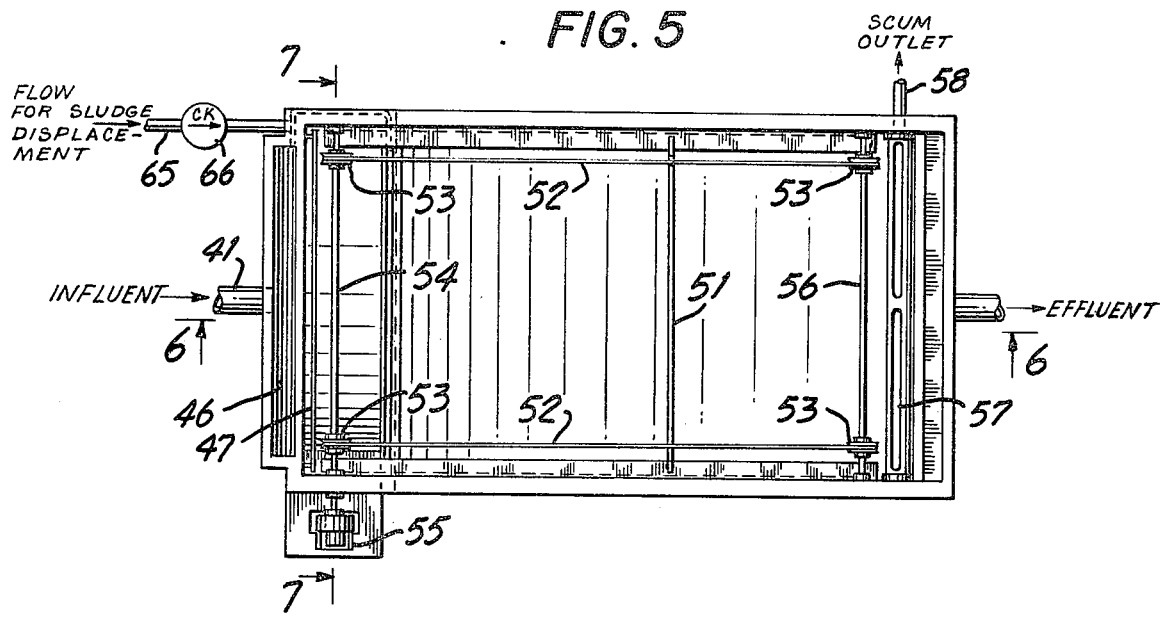
FIG. 5 is a plan view of a rectangular settling tank embodying the present invention.
Figure 6:
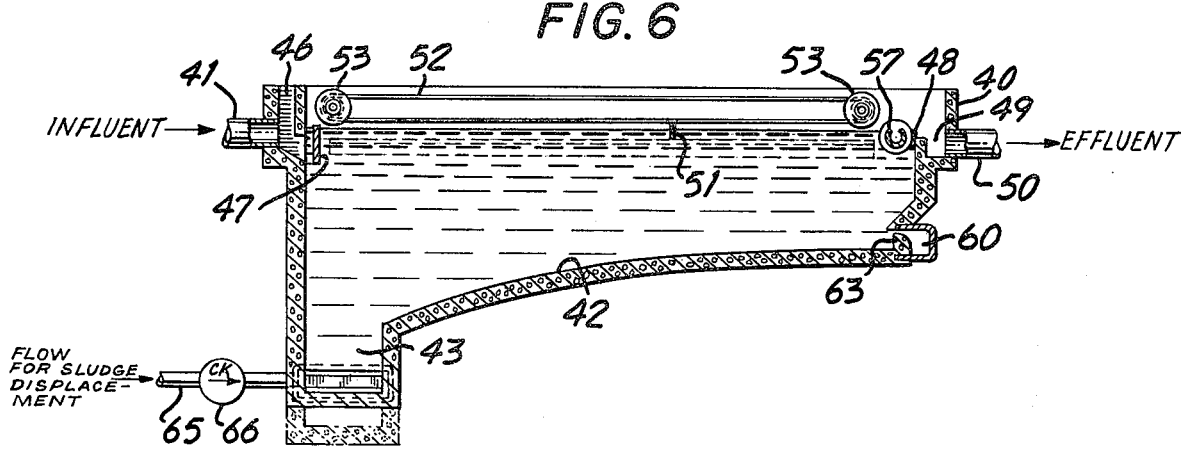
Figure 7:
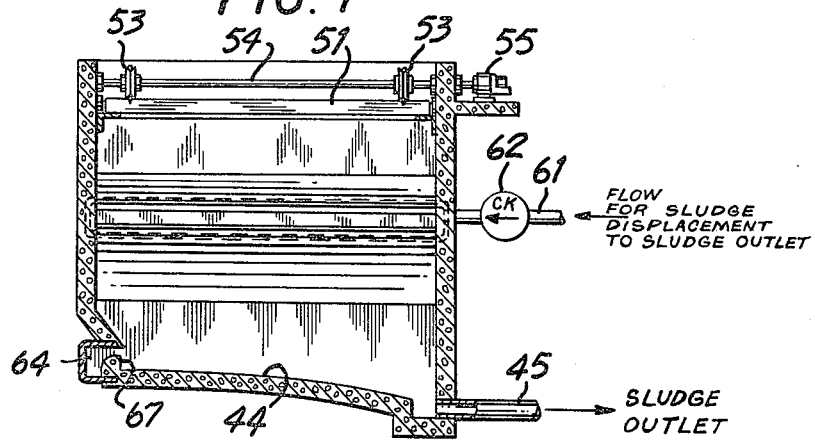

FIGS. 6 and 7 are sectional views taken along the lines 6—6 and 7—7, respectively, of FIG. 5 looking in the direction of the arrows;

FIG. 8 is a plan view of a modified form of the settling tank shown in FIG. 5, and FIGS. 9 and 10 are sectional views taken along the lines 9—9 and 10—10, respectively, of FIG. 8 looking in the direction of the arrows.

FIGS. 1 and 2 of the drawings show a circular settling tank 10 made of concrete or steel and generally of the type manufactured by the Link-Belt Division of FMC Corporation. The tank 10 has an influent conduit 11 for introducing sewage or industrial waste into the tank, a contoured lower surface 12 on which particulate matter, solids and sludge settle, a central discharge 13 into which they are ultimately displaced and an outlet conduit 14 from which they are removed from the tank.

A bridge 15, mounted on top of the tank, extends across the top thereof. An influent baffle 16 is rotatably mounted from the bridge by a rotatable shaft 17. The influent baffle is supported within the tank in a position such that the discharge from the influent conduit 11 takes place within the baffle 16. The baffle 16 is rotatably driven by a motor 18 through a drive transmission 19.

The rotatable baffle 16 carries a skimmer arm 20 having a scum remover 21 at the outer end thereof. The scum remover 21 sweeps the scum across the upper water level within the tank and up an inclined ramp 22 into a scum box 23 from which the scum is removed through a scum discharge conduit 24. The scum remover 21 is guided across the scum box 23 by a pair of guides 25, and on leaving the guides 25 it drops back into the upper region of the tank to commence another scum removing cycle. A baffle 21a at the outer end of the scum remover helps retain the scum for deposit in the scum box.

The particulate matter, solids and sludge settle at the bottom of the tank, and the water line within the tank is maintained by the flow of the liquid over the effluent weir 26 into an annular trough 27 from which it is removed by an effluent discharge conduit 28.

In conventional sludge removing settling tanks the sludge is removed by a system of scraper blades mounted on a submerged rotatable truss. These scraper blades scrape the solids and sludge from the lower surface of the tank and displace it toward a sludge discharge. The present invention eliminates the rotary truss and scraper blades and utilizes a fluid stream which sweeps across the lower contoured surface 12, clinging to the contoured surface by the well-known Coanda effect, to displace the settled matter in the tank toward the sludge discharge 13. Toward this end, an annular plenum chamber 30 surrounds the lower contoured surface 12 of the tank. The plenum chamber 30 is in communication with a source of fluid, such as water, through a supply conduit 31 and a check valve 32. The fluid from the plenum chamber flows across a step 33 defining the outer periphery of the lower contoured surface 12. The step 33, as shown in FIG. 2A, includes an upper lip a, a substantially vertical surface b, a substantially horizontal surface c, and an edge d which forms the outer periphery of the surface 12. The gently contoured convex curvature of the surface 12 clings the fluid thereto, sweeping the settled solids and sludge toward the central discharge 13. The fluid supply to the plenum chamber need not be continuous, but the fluid can be introduced intermittently as required to displace the solids, and the check valve 32 will prevent back flow of the liquid from the tank.

For a more detailed understanding of the Coanda effect, reference can be made to the article entitled "Applications of The Coanda Effect", p. 84 et seq., Scientific American, June 1966.

Figure 3:
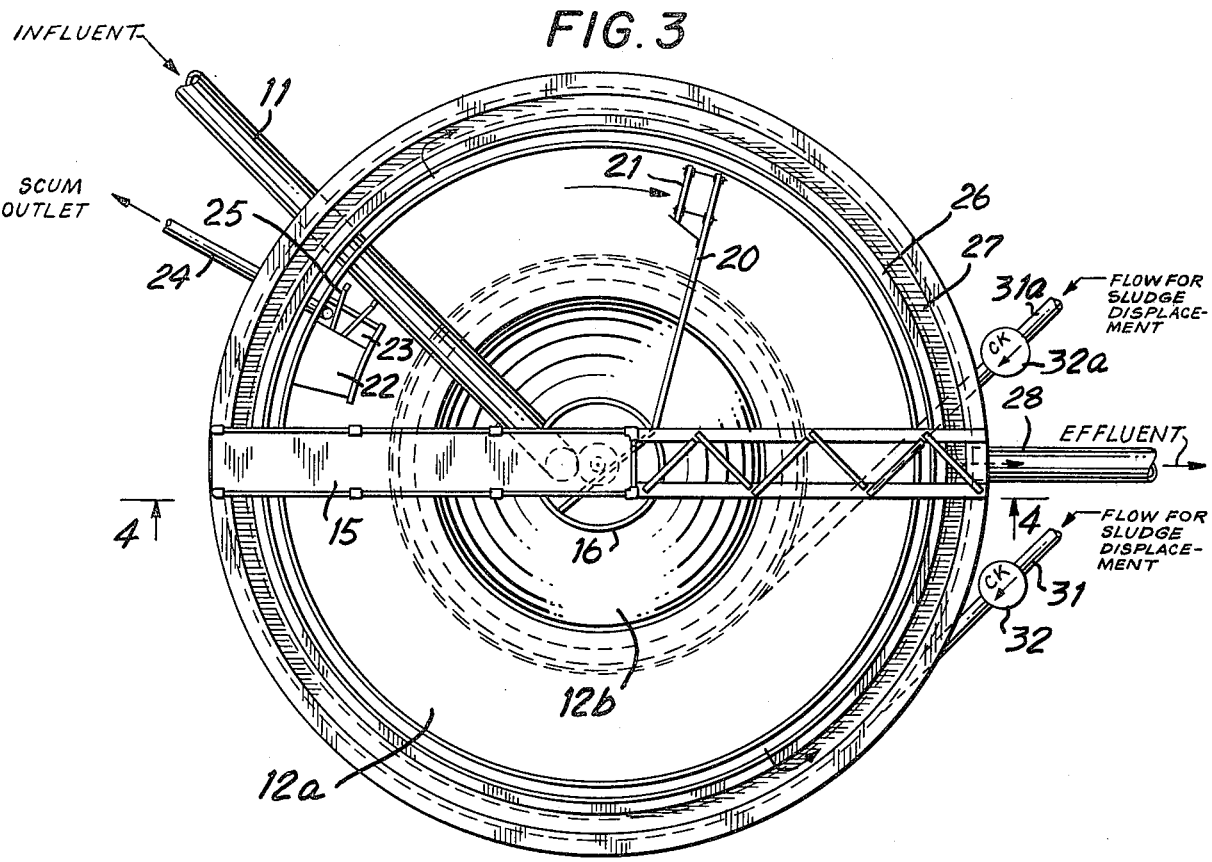
FIG. 3 is a plan view of a modified form of the settling tank shown in FIG. 1.
Figure 4:
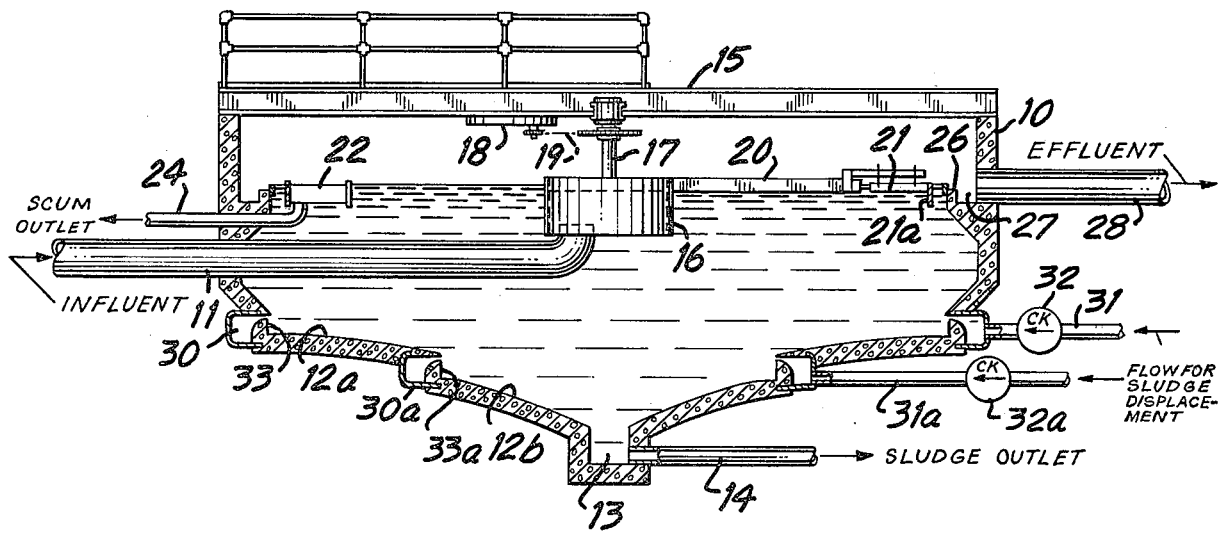
FIG. 4 is a sectional view taken along the line 4—4 of FIG. 3 looking in the direction of the arrows.

A modified form of the settling tank shown in FIGS. 3 and 4 of the drawings has the contoured lower surface of the tank divided into an upper region 12a and a lower region 12b so that the displacement of the solids and sludge by the Coanda effect takes place in two stages. The discharge of fluid from the plenum chamber 30 across the step 33 sweeps the fluid across the contoured surface 12a, moving the solids and sludge downwardly to the contoured surface 12b. Another plenum chamber 30a surrounds the outer periphery of the upper end of the contoured surface 12b. The plenum chamber 30a is in communication with a source of fluid under pressure through a conduit 31a and a check valve 32a. The fluid introduced from the plenum chamber 30a flows across a step 33a defining the outer periphery of the contoured surface 12b, and the downward sweep of fluid displaces the solids and sludge from the surface 12b toward the central discharge 13.

Any number of stages can be used to displace the solids and sludge across the lower contoured surface of the settling tank toward the discharge from the tank. The debris sweeping fluid may be supplied continuously or intermittently and the stages may supply the debris sweeping fluid simultaneously or in sequence.

FIGS. 5 to 7 of the drawings show a rectangular settling tank generally of the type manufactured by Jeffrey Manufacturing Company of Columbus, Ohio. The tank designated by the reference numeral 40 has an influent conduit 41 for introducing sewage or industrial waste into the tank, a longitudinally extending lower contoured surface 42 on which particulate matter, solids and sludge settle within the settling tank, a transversely extending discharge trough 43 at the lower, deeper end of the settling tank, a transversely extending contoured lower surface 44 within the discharge trough 43 and a solids and sludge discharge conduit 45 for removing the solids and sludge from the deeper end of the discharge trough 43.

The influent to be treated is introduced into a channel 46 which extends transversely across the settling tank at the deeper end thereof. The lower end of the channel communicates with the upper region of the tank, and a baffle 47 spaced apart from the entrance into the tank directs solids and sludge downwardly toward the discharge trough 43. The liquid phase within the tank is discharged from the opposite, more shallow end of the tank across a weir 48 into a transversely extending channel 49 from which the effluent is discharged by a conduit 50.

Scum is removed from the upper region of the tank by a transversely extending skimmer flight 51 carried by a conveyor. The conveyor includes a pair of spaced apart chains or carriers 52, each guided around a pair of sprockets or pulleys 53 at opposite ends of the tank. The flight can be supported at opposite ends as it travels along its upper and lower spans. The sprockets or pulleys 53 at the deeper end of the tank are mounted on a transversely extending drive shaft 54 which is driven by a motor 55. The sprockets or pulleys at the shallow end of the tank are supported on a transversely extending driven shaft 56. The conveyor carries one or more flights 51 across the upper region of the tank partly submerged in the liquid to displace scum forming in the tank from the deeper end toward the more shallow end of the tank. A rotatable scum remover 57 extends transversely across the tank near the discharge end of the skimming conveyor, and the scum swept into the scum remover at the end of the flight is carried off from the scum skimmer through a scum outlet conduit 58.

The particulate matter, solids and sludge settle to the bottom of the tank, and in conventional sludge removing settling tanks they are removed from the bottom of the tank by a system of scraper blades carried longitudinally across the floor of the settling tank by a submerged conveyor system. The present invention eliminates the submerged conveyor system and utilizes instead a fluid stream which sweeps across the lower contoured surface 42 of the settling tank utilizing the well-known Coanda effect to cause the sweeping fluid to adhere to the contoured surface to displace the settled matter in the tank toward the discharge trough 43.

A transversely extending plenum chamber 60 extends across the upper end of the contoured surface 42, and one end of the plenum chamber is in communication with a source of debris removing fluid through a conduit 61 and a check valve 62. The fluid from the plenum chamber 60 flows across a step 63 defining the upper end of the longitudinally extending contoured surface 42, and as the fluid sweeps across the contoured surface the settled solids and sludge are displaced into the discharge trough 43 at the deeper end of the tank.

The discharge trough 43 has a more shallow end and a deeper end. The plenum chamber 64 extends longitudinally across the more shallow end of the discharge trough 43, and the plenum chamber 64 is in communication with a source of fluid through a supply conduit 65 and a check valve 66. The fluid from the plenum chamber 64 flows across a step 67 defining the upper end of the contoured surface 44 and the fluid flows across the contoured surface 44, sweeping the settled solids and sludge to the lower end thereof, from which they are discharged from the tank by the sludge outlet conduit 45.

The settling tank shown in FIGS. 8 through 10 is a modified form of the settling tank shown in FIGS. 5 through 7 in that the Coanda effect is subdivided into a plurality of multiple stages. Toward this end, a longitudinally extending lower contoured surface of the settling tank is divided into an upper section 42a and a lower section 42b so that the displacement of the solids and sludge is permitted to take place in two stages. The discharge of fluid from the plenum chamber 60 across the step 63 sweeps the fluid across the contoured surface 42a, moving the solids and sludge downwardly toward the discharge trough 43. Another plenum chamber 60a extends longitudinally across the tank at the upper end of the contoured surface 42b. The plenum chamber 60a is in communication with a supply conduit 61a which supplies fluid to the plenum chamber 60a through a check valve 62a. The fluid introduced from the plenum chamber 60a flows across a step 63a defining the upper end of the contoured surface 42b, and the downward flow of fluid across the surface 42b sweeps the solids and sludge toward the discharge trough 43. A multiple stage sweep of fluid may also be provided to displace the solids and sludge across the transversely extending contoured surface 44 to the sludge discharge conduit 45.

The invention has been shown and described in preferred forms and by way of examples only, and many modifications and variations of the invention are encompassed within the spirit of the invention. The invention is not to be limited to any specified form or embodiment, except in so far as such limitations are expressly set forth in the claims.

I claim:

1. A settling tank for settling particulate matter from a body of liquid in the tank comprising means for supplying liquid containing the particulate matter to the settling tank for removal of the particulate matter therefrom, means for discharging from the upper region of the settling tank the liquid from which the particulate matter has been removed to maintain a level of liquid in the tank, a settling surface at the bottom of the tank on which the particulate matter settles from the liquid and having the upper surface thereof contoured to cause a fluid flow across it relative to the body of liquid in the settling tank to cling to the settling surface by the Coanda effect, displacing the particulate matter settled on the settling surface across the surface and relative to the body of liquid in the tank, a discharge for the particulate matter communicating with the downstream end of the contoured settling surface and a fluid inlet below the normal level of the liquid in the tank at substantially the level of the upstream end of the structured settling surface to provide the fluid which flows across the contoured settling surface relative to the body of liquid in the settling tank to displace the particulate matter toward the discharge.

2. A settling tank as set forth in claim 1 including a plenum chamber extending across the upstream end of the contoured surface and establishing communication between a source of fluid under pressure and the fluid inlet.

3. A settling tank as set forth in claim 2 including a check valve between the source of fluid under pressure and the plenum chamber.

4. A settling tank as set forth in claim 2 in which the plenum chamber is an annular chamber which extends around the tank.

5. A settling tank as set forth in claim 2 in which the plenum chamber extends across one end of the tank.

6. A settling tank as set forth in claim 1 in which the contoured settling surfaces includes an upstream contoured surface and a downstream contoured surface and including plenum chambers extending across the upstream ends of both upstream and downstream contoured surfaces.

7. A method of separating particulate matter in a settling tank having a contoured settling surface on which the particulate matter settles from a body of liquid in the tank, said contoured surface being substantially below the normal level of the liquid in the tank, comprising supplying liquid containing the particulate matter to the settling tank for removal of the particulate matter therefrom, discharging from the upper region of the settling tank the liquid from which the particulate matter has been removed to maintain a level of liquid in the tank, discharging the particulate matter at the downstream end of said contoured surface, introducing a fluid substantially below the normal level of the liquid in the tank and at substantially the level of said upstream end of the contoured settling surface and flowing said fluid across the contoured surface utilizing the Coanda effect to cause the fluid to cling to the contoured surface and displace the particulate matter settled on the contoured surface before discharging the particulate matter at the downstream end of the contoured surface.

8. A method as set forth in claim 7 in which the settling tank has an upstream contoured surface and a downstream contoured surface and including introducing a first fluid substantially below the normal level of the liquid in the tank and at substantially the level of the upstream end of the upstream contoured settling surface and introducing a second fluid substantially below the normal level of the liquid in the tank and at substantially the level of said upstream end of the downstream contoured settling surface and flowing both fluids across their respective contoured surfaces utilizing the Coanda effect to cause the fluid to cling to the respective contoured surface and displace the particulate matter settled thereon before discharging the particulate matter.

* * * * *